United States Patent
Grossman et al.

(10) Patent No.: US 8,697,157 B2
(45) Date of Patent: *Apr. 15, 2014

(54) MEAL REPLACEMENT BEVERAGE

(75) Inventors: Terry Grossman, Denver, CO (US); Raymond C. Kurzweil, Newton, MA (US)

(73) Assignee: Ray and Terry's Health Products, Inc., Wellesley Hills, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/848,467

(22) Filed: Aug. 2, 2010

(65) Prior Publication Data

US 2010/0297298 A1    Nov. 25, 2010

Related U.S. Application Data

(63) Continuation of application No. 10/939,604, filed on Sep. 13, 2004, now Pat. No. 7,767,245.

(60) Provisional application No. 60/502,813, filed on Sep. 12, 2003.

(51) Int. Cl.
*A23L 1/308* (2006.01)

(52) U.S. Cl.
USPC .......... 426/72; 426/73; 426/74; 426/615; 426/620; 426/639; 426/656; 426/658

(58) Field of Classification Search
USPC .......... 426/72, 73, 74, 620, 615, 640, 639, 426/658, 656
See application file for complete search history.

(56) References Cited

U.S. PATENT DOCUMENTS

| | | | |
|---|---|---|---|
| 5,985,339 A | 11/1999 | Kamarei | |
| 6,248,375 B1 | 6/2001 | Giles et al. | |
| 6,599,553 B2 * | 7/2003 | Kealey et al. | 426/593 |
| 2002/0192310 A1 | 12/2002 | Bland et al. | |
| 2003/0125301 A1 | 7/2003 | Wolf et al. | |
| 2004/0071825 A1 | 4/2004 | Lockwood | |
| 2004/0081715 A1 | 4/2004 | Schmitz et al. | |
| 2004/0096547 A1 | 5/2004 | Ferruzzi | |
| 2005/0175671 A1 | 8/2005 | De Jong | |

FOREIGN PATENT DOCUMENTS

| | | |
|---|---|---|
| JP | 40-1141572 A | 6/1989 |
| JP | 40-4135460 A | 6/1992 |

OTHER PUBLICATIONS

CARB/PRO Essential fitness, www.essentialfitness.com/massmaker.html, 1 page.*
Rombauer et al., "Cocoa", *Joy of Cooking*, Bobbs-Merrill Co., Inc., New York, pp. 41 (1975).

* cited by examiner

*Primary Examiner* — Helen F Heggestad
(74) *Attorney, Agent, or Firm* — Fish & Richardson P.C.

(57) ABSTRACT

Meal replacement compositions are described herein. The meal replacement compositions are made using all natural ingredients and includes relatively high amounts of fiber and protein and relatively low amounts of fat. In some instances, a single serving of a meal replacement composition includes high amounts of cocoa, an ingredient containing plant polyphenols.

5 Claims, No Drawings

MEAL REPLACEMENT BEVERAGE

CROSS-REFERENCE TO RELATED APPLICATIONS

This application is a continuation of and claims priority under 35 USC §120 to U.S. patent application Ser. No. 10/939,604, filed on Sep. 13, 2004, now U.S. Pat. No. 7,767,245 which claims priority under 35 USC §119(e) to U.S. Patent Application Ser. No. 60/502,813, filed on Sep. 12, 2003, the entire contents of which are hereby incorporated by reference.

TECHNICAL FIELD

This invention relates to meal replacement beverages and related compositions.

BACKGROUND

Recent results of the National Health and Nutrition Examination Survey (NHANES) 1999 indicate that an estimated 61 percent of U.S. adults are either overweight or obese, defined as having a body mass index (BMI) of 25 or more. One popular way to control calories without sacrificing nutrition is with a meal replacement beverage that is balanced in nutrition while at the same time being low in calorie.

Moreover, a growing percent of the population is becoming concerned with the consumption of non-natural ingredients such as pesticides, artificial sweeteners, coloring, flavoring and preservatives. Accordingly, it is desirable to have a product that is made with all natural ingredients as opposed to artificial ingredients, for examples artificial colors, thickeners or sweeteners.

SUMMARY

The invention is directed to a composition for use as a complete meal replacement, using all natural, non-artificial ingredients to elicit a sensation of satiety and to inhibit feeding, while providing a high source of vitamins, minerals, fibers and proteins to create a nutritionally balanced diet as part of a weight control program.

The meal replacement composition (MRC) of the present invention is designed to provide the essential nutritional and health needs of an individual when used as a total meal replacement at least once each day for an extended period and contains a relatively high concentration of protein, fiber, vitamins, minerals and proteins. Additionally, the meal replacement composition includes relatively high amounts of cocoa. Cocoa is a beneficial ingredient as it is high in plant polyphenols, which have been implicated in the reduction of blood pressure.

The invention is further directed to a meal replacement beverage having a novel composition which, when blended with an ingestible liquid, such as milk (e.g., cow's milk, soy milk or rice milk), produces a highly palatable, highly nutritious instant shake. Another object of the invention is to provide an improved weight control product, which is readily and conveniently employed such as by the blending of the same with milk or other ingestible liquid, prior to the ingesting of the blended product. Alternatively, the composition can be already mixed with an ingestible liquid and provided to a consumer already prepared.

In one aspect, the invention features a meal replacement composition, each serving including a protein, fiber, vitamins, minerals, egg white powder, a natural sweetener, and at least 12 g cocoa.

In some instances, the protein includes at least one of a soy protein isolate or a whey protein.

In some instances, the natural sweetener comprises a combination of stevia with FOS.

In some instances, the meal replacement composition also includes soy lecithin and flax meal.

In some instances, the meal replacement composition also includes at least one of a natural vanilla or natural chocolate flavoring.

In one aspect, the invention features a meal replacement composition, a single serving including soy protein isolate, whey protein, egg white powder, fiber blend, FOS, stevia, chocolate flavor, vanilla flavor, a vitamin-mineral mixture, cocoa, soy lecithin, and flax meal.

In some instances, a serving of the meal replacement composition includes at least 12 g of cocoa.

The term "FOS" refers to fructooligosaccharide, which belongs to a group of naturally-occurring carbohydrates containing non-digestible fructooligosaccharides, and are commonly referred to as FOS in the nutrition industry.

In some instances, the meal replacement composition includes about 15 g soy protein isolate, 6 g whey protein, 2 g egg white powder, 1.75 g fiber blend, 3 g FOS, 0.6 g stevia, 9.12 g chocolate flavor, 0.18 g vanilla flavor, 1.44 g a vitamin-mineral mixture, 12 g cocoa, 2 g soy lecithin, and 2.6 g flax meal per serving.

In some instances, the meal replacement composition includes about 300 RE Vitamin A, about 50 mg vitamin C, about 80 IU vitamin D, about 5 mg vitamin E, about 0.6 mg vitamin B1, about 0.65 mg vitamin B2, about 4 mg vitamin B3, about 1.3 mg vitamin B6, about 160 mcg folate, about 1.2 mcg vitamin B12, about 15 mcg biotin, about 3 mg vitamin B5, about 250 mg Calcium, about 50 mcg Iodine, about 1.75 mg Manganese, about 200 mg Magnesium, about 5 mg Zinc, about 30 mg Selenium, about 0.6 mg Copper, about 60 mcg Chromium, about 60 mcg Molybedum, and about 800 mg Potassium per serving.

In another aspect, the invention features a meal replacement composition including essentially the ingredients of soy protein isolate, whey protein, egg white powder, fiber blend, FOS, stevia, chocolate flavor, vanilla flavor, a vitamin-mineral mixture, cocoa, soy lecithin, and flax meal.

In some instances, the meal replacement composition can include essentially about 15 g soy protein isolate, 6 g whey protein, 2 g egg white powder, 1.75 g fiber blend, 3 g FOS, 0.6 g stevia, 9.12 g chocolate flavor, 0.18 g vanilla flavor, 1.44 g a vitamin-mineral mixture, 12 g cocoa, 2 g soy lecithin, and 2.6 g flax meal per serving.

In other instances, the meal replacement composition can include essentially about 300 RE Vitamin A, about 50 mg vitamin C, about 80 IU vitamin D, about 5 mg vitamin E, about 0.6 mg vitamin B1, about 0.65 mg vitamin B2, about 4 mg vitamin B3, about 1.3 mg vitamin B6, about 160 mcg folate, about 1.2 mcg vitamin B12, about 15 mcg biotin, about 3 mg vitamin B5, about 250 mg Calcium, about 50 mcg Iodine, about 1.75 mg Manganese, about 200 mg Magnesium, about 5 mg Zinc, about 30 mg Selenium, about 0.6 mg Copper, about 60 mcg Chromium, about 60 mcg Molybedum, and about 800 mg Potassium per serving.

In another aspect, the invention features a meal replacement composition consisting of soy protein isolate, whey protein, egg white powder, fiber blend, FOS, stevia, chocolate flavor, vanilla flavor, a vitamin-mineral mixture, cocoa, soy lecithin, and flax meal.

In some aspect, the meal replacement composition consists of about 15 g soy protein isolate, 6 g whey protein, 2 g egg white powder, 1.75 g fiber blend, 3 g FOS, 0.6 g stevia, 9.12 g chocolate flavor, 0.18 g vanilla flavor, 1.44 g a vitamin-mineral mixture, 12 g cocoa, 2 g soy lecithin, and 2.6 g flax meal per serving.

In other instances, the meal replacement composition consists of about 300 RE Vitamin A, about 50 mg vitamin C, about 80 IU vitamin D, about 5 mg vitamin E, about 0.6 mg vitamin B1, about 0.65 mg vitamin B2, about 4 mg vitamin B3, about 1.3 mg vitamin B6, about 160 mcg folate, about 1.2 mcg vitamin B12, about 15 mcg biotin, about 3 mg vitamin B5, about 250 mg Calcium, about 50 mcg Iodine, about 1.75 mg Manganese, about 200 mg Magnesium, about 5 mg Zinc, about 30 mg Selenium, about 0.6 mg Copper, about 60 mcg Chromium, about 60 mcg Molybedum, and about 800 mg Potassium per serving.

It is envisioned that any of the meal replacement compositions described herein can also include an ingestible liquid such as animal milk, soymilk, rice milk, or water.

In some instances, the meal replacement compositions described herein are substantially free of iron. The meal replacement compositions can also be essentially free of artificial ingredients.

In some instances, one or more of the meal replacement compositions described herein includes greater than 20 grams of protein, and greater than 9 grams of fiber per serving.

The details of one or more embodiments of the invention are set forth in the description below. Other features, objects, and advantages of the invention will be apparent from the description and from the claims.

DETAILED DESCRIPTION

The composition of the invention is a balanced formulation of protein, carbohydrates, dietary fibers, vitamins and minerals at an appropriate caloric content. Moreover, the meal replacement composition includes high amounts of cocoa, which has been implicated in the reduction of blood pressure. In addition to the benefits that cocoa provides with respect to reduced blood pressure, cocoa also provides texture and flavor to the meal replacement composition.

Each of the ingredients in the meal replacement composition, including the chocolate and vanilla flavoring, is all natural and contains no artificial ingredients (e.g., colors, sweeteners, etc.) The term "natural" means a product comes in a form identical to what is found in nature. The term "artificial," on the other hand, implies a product is not found in nature, but rather is different from what is found in nature.

One example of an all natural sweetener is the combination of stevia with FOS. This combination, used with another ingredient, for example, soy protein, provides a composition having desired bulk and texture together with sweetness. The combination of stevia with FOS provides the sweetness, together with other nutritional benefits. For example, stevia provides has been implicated in the regulation of blood sugar levels. However, stevia can be bitter. Accordingly, the stevia is combined with FOS to significantly ameliorate the bitterness and to provide an improved sweet flavor.

The ingredients for the dry food composition, the proportions of ingredients used on a part by weight basis, and corresponding nutritional information (i.e., amounts of carbohydrates, fiber, fat, protein, and sodium) are provided in Tables 1 and 2 below:

TABLE 1

Ingredients by weight and corresponding calories

| Ingredient | Grams-Batch | Grams Per Serv | Calories |
| --- | --- | --- | --- |
| Soy Protein Isolate | 180.00 | 15.00 | 50.00 |
| Whey Protein | 72.00 | 6.00 | 25.00 |
| Egg White powder | 24.00 | 2.00 | 6.00 |
| Fiber blend | 21.00 | 1.75 | 0.00 |
| FOS | 36.00 | 3.00 | 0.00 |
| Stevia | 7.20 | 0.60 | 0.00 |
| Chocolate Flavor | 1.40 | 0.12 | 0.00 |
| Vanilla Flavor | 2.16 | 0.18 | 0.00 |
| Vitamin-Mineral Mix | 17.28 | 1.44 | 0.00 |
| Cocoa | 144.00 | 12.00 | 30.00 |
| Soy Lecithin | 24.00 | 2.00 | 10.00 |
| Flax Meal | 31.20 | 2.60 | 10.00 |
| Total | 560.24 | 46.69 | 131.00 |

TABLE 2

Ingredients by weight and corresponding nutritional content

| Ingredient | Grams per Serv | Net Carbs | Fiber | Fat | Protein | Sodium |
| --- | --- | --- | --- | --- | --- | --- |
| Soy Protein Isolate | 15.00 | 0.00 | 0.00 | 0.00 | 12.50 | 130.00 |
| Whey Protein | 6.00 | 0.40 | 0.00 | 0.40 | 4.60 | 10.00 |
| Egg White powder | 2.00 | 0.00 | 0.00 | 0.00 | 1.50 | 26.00 |
| Fiber blend | 1.75 | 0.00 | 1.75 | 0.00 | 0.00 | 1.00 |
| FOS | 3.00 | 0.00 | 3.00 | 0.00 | 0.00 | 0.00 |
| Stevia | 0.60 | 0.00 | 0.00 | 0.00 | 0.00 | 0.00 |
| Chocolate Flavor | 0.12 | 0.00 | 0.00 | 0.00 | 0.00 | 0.00 |
| Vanilla Flavor | 0.18 | 0.00 | 0.00 | 0.00 | 0.00 | 0.00 |
| Vitamin-Mineral Mix | 1.44 | 0.00 | 0.00 | 0.00 | 0.00 | 0.00 |
| Cocoa | 12.00 | 1.95 | 3.90 | 3.00 | 1.95 | 0.00 |
| Soy Lecithin | 2.00 | 0.00 | 0.00 | 1.00 | 0.00 | 0.00 |
| Flax Meal | 2.60 | 0.00 | 0.80 | 0.90 | 0.60 | 0.00 |
| Total | 46.69 | 2.35 | 9.45 | 5.30 | 21.15 | 167.00 |

As demonstrated in Tables 1 and 2, a serving of the meal replacement composition provides an individual 2.35 g of carbohydrates, 9.45 g of fiber, 5.3 g of fat, 21.15 g of protein, and 167.00 g of sodium while having only 131 calories. One would understand that both the nutritional content and calorie amount would change when the meal replacement composition is mixed with an ingestible fluid upon consumption. The change in calorie and nutritional content will vary with the type of ingestible fluid as well as the amount of ingestible fluid.

While amounts for each component of the meal replacement composition are provided in Tables 1 and 2, the amounts of the ingredients can vary, and other amounts are contemplated as within the scope of the invention. For example, the amounts of each of the ingredients could vary by about 50%. In some instances, the variation could be less, and in some instances the variation could be even greater. Accordingly, a representative range of soy protein isolate would be about 7.5 g/serving to about 22.5 g/serving and a representative range of whey protein would be about 3 g/serving to about 9 g/serving. Amounts of other ingredients could be varied in a similar manner.

To manufacture the meal replacement composition, all of the ingredients are mixed together, e.g., in 100 lb vats using a ribbon mixer. After combination in large containers, the MRC is packaged into smaller portions for sale to the consumer. In some instances, the meal replacement composition is further combined with an ingestible fluid, such as soymilk, and then packaged and sold to the consumer ready to consume.

The individual ingredients of the meal replacement composition are all commercially available retail products.

A single serving of the meal replacement composition includes about 100-120 cc of the described meal replacement composition. The vitamins and minerals provided per serving of the described meal replacement composition are set forth in Table 3 below:

TABLE 3

Vitamin and Mineral amounts and % RDA

| | MRC Amount Amt | | 100% RDA M 31-50 | | MRC % RDA |
|---|---|---|---|---|---|
| Vit A | 300 | RE | 1000 | RE | 30% |
| Vit C | 50 | mg | 60 | mg | 83% |
| Vit D | 80 | IU | 200 | IU | 40% |
| Vit E | 5 | mg | 10 | mg | 50% |
| B1 | 0.6 | mg | 1.2 | mg | 50% |
| B2 | 0.65 | mg | 1.3 | mg | 59% |
| B3 | 4 | mg | 16 | mg | 25% |
| B6 | 1.3 | mg | 1.3 | mg | 150% |
| Folate | 160 | mcg | 400 | mcg | 40% |
| B12 | 1.2 | mcg | 2.4 | mcg | 50% |
| Biotin | 15 | mcg | 30 | mcg | 50% |
| B5 | 3 | mg | 5 | mg | 60% |
| Calcium* | 250 | mg | 000 | mg | 25% |
| Iodine | 50 | mcg | 150 | mcg | 33% |
| Manganese | 1.75 | mg | 3.5 | mg | 50% |
| Magnesium | 100 | mg | 420 | mg | 24% |
| Zinc | 5 | mg | 15 | mg | 33% |
| Selenium | 30 | mg | 70 | mg | 43% |
| Copper | 0.6 | mg | 2 | mg | 30% |
| Chromium | 60 | mcg | 150 | mcg | 40% |
| Molybedum | 60 | mcg | 150 | mcg | 40% |
| Iron* | 0 | mg | 10 | mg | 0% |
| Potassium | 800 | mg | 2000 | mg | 40% |

*Iron is purposely excluded from the formulation.

One of skill in the art would understand, given the variation in serving size from about 100-120 cc of the meal replacement composition, that the nutritional amounts provided in Table 3 are subject to variation, for example, depending on the amount of meal replacement composition consumed. Accordingly, the nutritional amounts for the described meal replacement composition provided in Table 3 could vary by about 20%. These nutritional amounts are subject to further variation with the change in the formulation of the meal replacement composition. For example, one of skill in the art would understand that a change in relative percentages of ingredients would lead to a change in overall nutritional content even where the serving size of the meal replacement composition remains constant.

As shown in the nutritional information provided in Table 3 above, the described meal replacement composition formulation is essentially free of iron. Iron can act as a pro-oxidant and should not routinely be taken by anyone who is not anemic, as the pro-oxidant property of iron can cause tissue damage in the body. Accordingly, it is desirable in many instances to provide a meal replacement beverage that is formulated without iron.

When preparing the meal replacement beverage of the present invention, about eight to twelve ounces of ingestible fluid (e.g., Vitamin A and D protein fortified 1% milk or soy milk) is poured into a container together with one unit serving of the meal replacement composition (i.e., about 100-120 cc). In some instances, the container is a glass or a blender. The meal replacement composition and fluid can be mixed together by a spoon, by shaking the container, or alternatively, if the container is a blender, blending the meal replacement composition with the fluid.

A number of embodiments of the invention have been described. Nevertheless, it will be understood that various modifications may be made without departing from the spirit and scope of the invention. Accordingly, other embodiments are within the scope of the following claims.

What is claimed is:

1. A meal replacement composition each serving consisting of soy protein isolate, whey protein, egg white powder, fiber blend, FOS, stevia, chocolate flavor, vanilla flavor, a vitamin-mineral mixture, cocoa with the cocoa being 25% of the weight of a serving, soy lecithin, and flax meal.

2. The meal replacement composition of claim 1, consisting of about 15 g soy protein isolate, 6 g whey protein, 2 g egg white powder, 1.75 g fiber blend, 3 g FOS, 0.6 g stevia, 9.12 g chocolate flavor, 0.18 g vanilla flavor, 1.44 g a vitamin-mineral mixture, 12 g cocoa, 2 g soy lecithin, and 2.6 g flax meal per serving.

3. The meal replacement composition of claim 1, consisting of about 300 RE Vitamin A, about 50 mg vitamin C, about 80 IU vitamin D, about 5 mg vitamin E, about 0.6 mg vitamin B1, about 0.65 mg vitamin B2, about 4 mg vitamin B3, about 1.3 mg vitamin B6, about 160 mcg folate, about 1.2 mcg vitamin B12, about 15 mcg biotin, about 3 mg vitamin B5, about 250 mg Calcium, about 50 mcg Iodine, about 1.75 mg Manganese, about 200 mg Magnesium, about 5 mg Zinc, about 30 mg Selenium, about 0.6 mg Copper, about 60 mcg Chromium, about 60 mcg Molybdenum, and about 800 mg Potassium per serving.

4. The meal replacement composition of claim 1, wherein the composition is substantially free of iron.

5. The meal replacement composition of claim 1, wherein the meal replacement composition is substantially free of artificial ingredients.

* * * * *